Feb. 21, 1956          A. DRAVNIEKS          2,735,754

INDUSTRIAL CORROSION TESTING AND RECORDING

Filed April 2, 1951          2 Sheets-Sheet 1

INVENTOR.
Andrew Dravnieks
BY
Everett A. Johnson
ATTORNEY

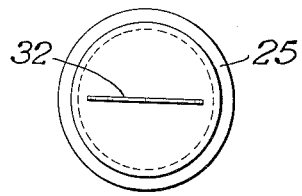
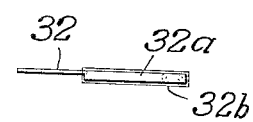
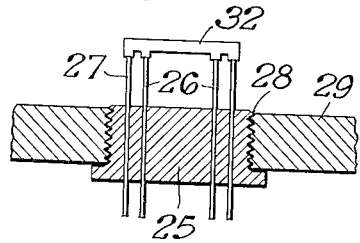
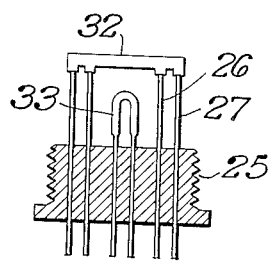
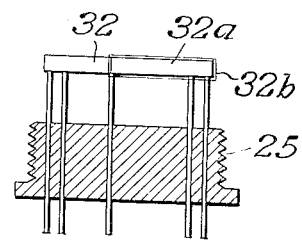
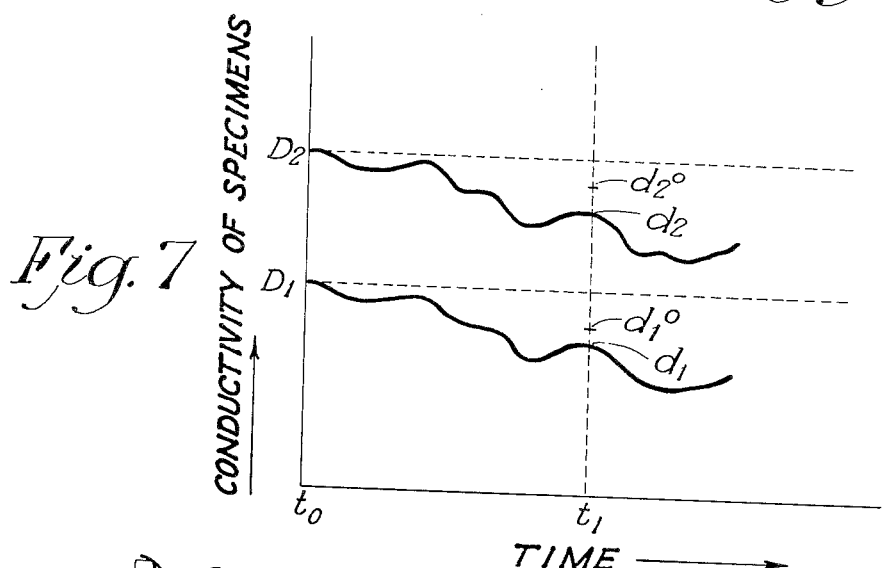
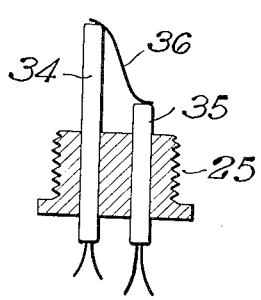
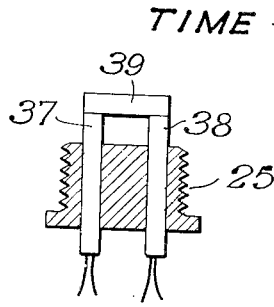
INVENTOR.
Andrew Dravnieks

United States Patent Office 2,735,754
Patented Feb. 21, 1956

2,735,754

INDUSTRIAL CORROSION TESTING AND RECORDING

Andrew Dravnieks, Park Forest, Ill., assignor to Standard Oil Company, Chicago, Ill., a corporation of Indiana Application April 2, 1951, Serial No. 218,828

15 Claims. (Cl. 23—230)

This invention relates to methods and apparatus for testing corrosion and erosion rates. More specifically the invention relates to apparatus suitable for testing the corrosion rate of metals in the presence of industrial corrosive substances.

Heretofore corrosion and erosion properties of fluids employed in various industrial installations have been tested by the removal of portions of the fluid and immersion of test specimens in such fluids; or by simulating the industrial conditions and placing test specimens in special apparatus for the purpose. Subsequently the test specimens have been removed at intervals and examined or weighed as an indication of the extent of corrosion or erosion. Such systems have not been entirely satisfactory for various reasons including the fact that the conditions under which the test may be conducted are not necessarily those to which the material will be subjected.

It has heretofore been proposed that a strip of metal be placed in the corrodent and the electrical resistance of the strip measured either at certain time intervals or continuously. As the corrosion of the strip proceeds, its thickness decreases and consequently the resistance increases. From this change in resistance, it is possible to calculate the average amount of metal removed by corrosion. However, the record obtained by such a method is dependent upon the battery voltage; two points are required for each recording of the condition of the specimen, one to record the potential drop along the specimen and another to record the current strength through the specimen; and an arithmetical computation is necessary to determine the extent of corrosion which has taken place.

It is an object of the present invention to provide a test element which gives a positive indication of corrosive conditions under operating conditions of the system in which it is tested. Another object is to provide a test system which yields a quantitative value in a short period of time. A further object is to provide a test element which is easily and inexpensively prepared. An additional object is to provide a method and apparatus which will automatically indicate the extent of corrosion. It is also an object of the invention to provide a system to indicate any abrupt increase of the corrosiveness of a medium in which the specimens are immersed. Still another object of the invention is to provide an apparatus which electrically and automatically measures and records the extent of corrosion or erosion of a test specimen maintained within an industrial stream.

I attain the objects of my invention by providing a direct corrosion recording system which makes it possible to follow the corrosion process automatically. Under substantially uniform industrial conditions, my invention provides a simple and positive means for determining either the characteristics of the fluids or the effect of such fluids on the equipment.

By my improved system, the initial current prior to corrosion may be calibrated so that the distance in chart units corresponds to the thickness of the metal strip specimen in thickness units. A potential controller maintains the potential drop across the specimen constant and as the specimen becomes thinner due to the corrosion, a smaller and smaller current is necessary to maintain the prescribed potential drop across the specimen. This decreasing current strength is recorded on the chart and indicates directly the extent of corrosion of the metal specimen. This circuit I refer to as a direct corrosion recording unit.

The specimens, which may be of the metal or alloy from which the vessel, conduit, or other equipment is fabricated, are supported by removable electrically insulating plugs and inserted through a tapped port in a metal wall. The exposed specimens are connected into my measuring and recording circuit and sufficient current is applied to maintain a selected potential drop across the specimen at the beginning of the test. As the test proceeds the applied current is automatically reduced to maintain the same or initial potential drop across the specimen and the current necessary is measured as an indication of the change in thickness of the test specimen. By this means the progress of corrosion or erosion of the specimen can be continuously or intermittently determined.

When the specimen is of the same material as the equipment, the specimen serves as an indicator of the attack of the corrosive fluid on the equipment itself. Plugs of this type may be inserted into various parts of industrial systems to follow the changing corrosive properties of the fluid streams. For this latter purpose a very perishable specimen may be used to indicate changes rapidly in the condition of the specimen due to corrosion or erosion.

Further details of my invention and specific examples thereof will become apparent as the following description thereof proceeds in conjunction with the drawings wherein:

Figures 4, 4a, 5, 6, 6a, 8 and 9 are views, partly in section, illustrating various embodiments of my corrosion testing elements; and Figure 7 is a graphical representation illustrating a temperature correction.

Figure 1:
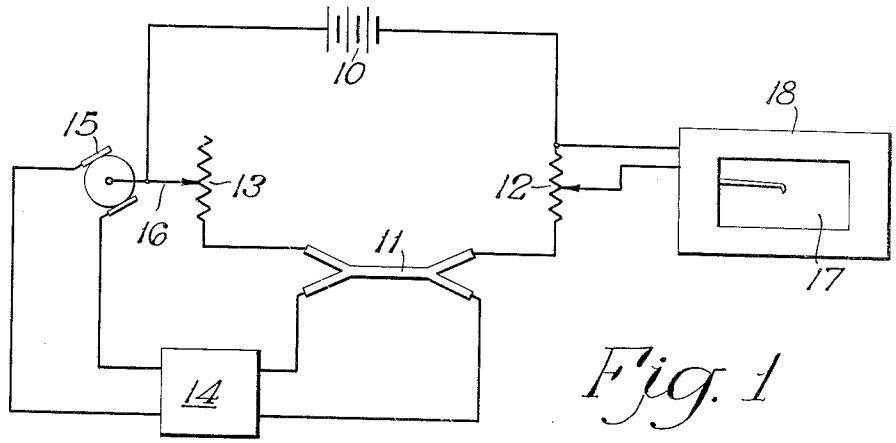
Figures 1 and 2 are circuit diagrams.

Referring to Figure 1, current from the battery 10 is passed through the specimen 11 and the adjustable resistance 12 and the variable resistance 13 which are in series. A potential indicator-controller 14, e. g. Brown Electronik potentiometer, holds the potential drop along the specimen 11 constant, acting in connection with a reversible electric motor 15, e. g. Brown Modutrol motor, which turns the moving contact 16 of the variable resistance 13. As the specimen 11 becomes thinner, due to the corrosion, a smaller and smaller current is necessary to maintain the prescribed potential drop across the specimen. This produces a potential drop across the resistance 12. This latter potential drop thus is proportional to the current strength and is recorded on the chart 17 of the recording potentiometer 18 and the recorded value is a measure of the cross section of the metal specimen 11, since it is directly proportional to it.

Figure 2:
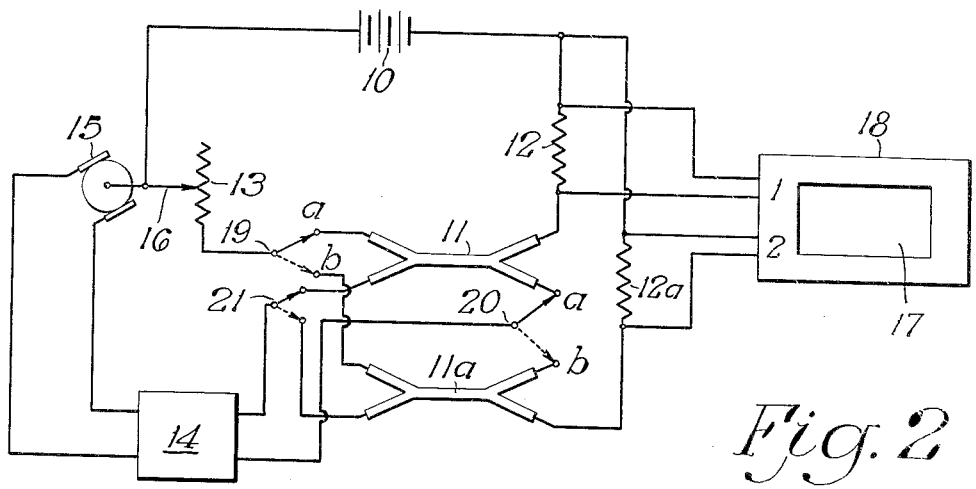

The system may be applied to several specimens in turn and in Figure 2 the same reference numerals 10 to 18 denote the corresponding elements of Figure 1. Rotary selector switches 19, 20 and 21 are controlled synchronously with a rotating selector switch (not shown) of the recording multipoint potentiometer 18. When the recording potentiometer 18 switches from recording point 1 to point 2, the ends 19, 20 and 21 of the potential adjuster 13—16 automatically connect by the synchronized rotary switches in turn to the ends of the specimens 11 and 11a. Thus the recording point 1 will register the corrosion of the specimen 11 and the recording point 2 will register the corrosion of the specimen 11a. Similarly, any number of specimens may be served in turn.

With the progress of corrosion or erosion, the cross-sectional area of the specimen decreases, and by adjusting the flow of current through the specimen so as to maintain a constant potential drop across the varying specimen, the adjusted current is an indication of the extent of corrosion which has taken place. For example, with a strip of a length L, width W and thickness D, where the length is greater than the width and the width greater than the thickness, the change of the width is practically negligible with the change in thickness. If in the beginning of the experiment a current of I amperes causes potential drop E along the specimen and after the corrosion or erosion these values are $I_t$ and $E_t$, the thickness of the layer of metal removed during the test from each face of the strip is $$P_1 = \left(\frac{I}{E} - \frac{I_t}{E_t}\right)\frac{E}{I} \times \frac{D}{2}$$

Accordingly, by adjusting the current I to maintain $E_t$ equal to E, during the test, the extent of corrosion of the specimen is indicated by a single value. By my system this adjustment is effected automatically and a single point is recorded for each measurement of the extent of corrosion.

Figure 3:
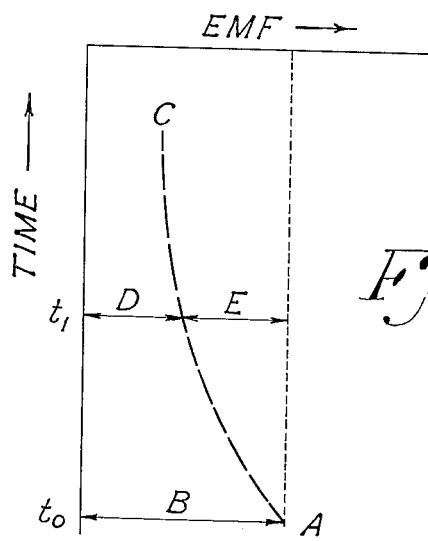
Figure 3 is a chart illustrating the use of my system.

An example of a chart record 17 obtained according to the apparatus of Figure 1 is set forth in Figure 3. Point A is the first recorded point, with the distance B from the vertical base line being directly proportional to the cross section of the strip specimen 11 prior to corrosion. As the corrosion proceeds, the record follows curve A—C. At instant $t_1$ the amount of cross section removed by corrosion is proportional to E and the cross section of the specimen remaining is proportional to D.

My direct corrosion recording unit may be applied to industrial systems for continuous or semi-continuous recording of a corrosion or erosion. A specially designed plug 25 made of an electrically insulating material such as porcelain or some plastic, e. g. Teflon, can be provided with two or more pairs of electrodes 26 and 27 and the plug inserted through tapped bore 28 in the wall 29 of the vessel or conduit in which the corrosion of a metal is to be observed.

In one embodiment four holes are drilled through plug 25 to receive the two pairs of electrodes 26 and 27 which may comprise threaded Chromel alloy rods of about 1/16 inch diameter extending through the plug 25 a uniform distance from the inner face thereof. A specimen of the metal or alloy to be tested for corrosion, e. g. steel, is machined or drawn into a strip about 0.75 inch long, 0.25 inch wide and 0.005 inch thick. This specimen is spot-welded to the ends of the Chromel rods. The current leads are applied to the outer pair of electrodes 27 and the potential leads to the inner pair of electrodes 26. Conventional removable jack plugs can be used for making the electrical contact with the outer ends of the corresponding electrode pairs. Other modifications in the plug construction can be made within the scope of the invention and some of these are described in connection with Figures 5 to 9, inclusive.

In a typical apparatus and operation, the specimen 11 comprised a copper strip of approximately 50 mm. in length, 2 mm. in width, and 0.05 mm. in thickness. The specimen was immersed in a sulfur-containing lubricating oil maintained at a temperature of about 250° C. The resistance 13, variable from about 3 to 60 ohms, is in series with a 6 volt storage battery 10 and the resistor 12. The resistance 12 is chosen such as to produce 50 millivolt potential drop at the terminals of the recording potentiometer 18 when a current of 1.3 amperes is sent through the specimen 11, such current at the beginning being necessary to maintain a 10 millivolt potential drop along the specimen 11. Thus in Figure 3 the initial distance B represents the 50 millivolts on the chart 17 of the recorder 18. This distance corresponds to 0.050 mm. of copper thickness at the beginning of the test, i. e. each millivolt is equivalent to 0.001 mm. of copper thickness. After a time $t_1$ of twenty-four hours, the recorded potential D was 45 millivolts, since a current of only 1.17 amperes was necessary to maintain the prescribed potential drop of 10 millivolts along the specimen 11. The distance E was 5 millivolts which corresponds to 0.005 mm. decrease in the total thickness of the copper strip specimen 11 due to corrosion. The amount of corrosion on a given surface thus was 0.0025 mm. in twenty-four hours. During this test, resistance 13 was continuously and automatically adjusted by contact 16 controlled by motor 15 in response to the potential sensing unit 14.

The arrangement illustrated in Figures 4 and 4a can be employed in those cases where the temperature of the corrosive medium is essentially constant, e. g. thermostated reactors, or the temperature coefficient of the electrical resistance of the metal specimen 32 can be considered negligibly small as is the case of nicrome or stainless steel over certain ranges of temperature.

The embodiment of Figures 4 and 4a uses four electrodes and permits a direct connection to the direct corrosion-recording unit as a substitute for specimen 11 in Figure 1 and as described above. The pair of electrodes 26 is used to pass an electric current through the specimen 32 and the other two electrodes 27 are used for sensing the potential drop along the specimen 32. As described above, in connection with Figure 1, the potential drop is maintained constant and the decreasing current necessary to maintain that potential is measured and recorded as an indication of the condition of the specimen 32 carried by the plug 25.

Referring to Figure 5, the testing element uses six electrodes and this type of element can be used when neither of the two above-described conditions obtains, i. e. where the temperature of the corrosive medium is not essentially constant or where the temperature coefficient of the electrical resistance of the sample cannot be considered negligible. Here in addition to the two pairs of electrodes 26 and 27 supporting the sample or specimen 32, a thermocouple 33 is used to obtain a record of the temperature of the corrosive fluid adjacent the sample. From the temperature readings so obtained, and the known or measured thermal coefficients of the electrical resistivity, it is possible to correct the readings obtained by the direct corrosion recording unit by accounting for the conductivity changes resulting from the temperature fluctuations alone.

The arrangement of the plug, sample, and electrodes illustrated in Figures 6 and 6a likewise may be used when the temperature of the corrosive medium changes. Here in addition to the specimen section 32, another considerably thicker, e. g. two to ten times as thick, specimen section 32a of the same sample material is used to account for the change of the electrical resistance of the specimen 32 with temperature. The conductivities of both sections 32 and 32a are recorded using the direct corrosion recording unit of Figure 2. By covering the thicker sample 32a with a protective layer 32b, e. g. lacquer or porcelain cement, so that it does not corrode, the conductivity change of the sample 32a may be used as a direct reference for temperature changes. If the section 32a is very much thicker than 32, this protection may be omitted, provided that a somewhat lower accuracy of measurement is still satisfactory.

If no protective layer 32b is employed, and both sections 32 and 32a are of comparable thickness (difference by factor 2–5, the following method may be used to analyze the record illustrated in Figure 7. At the initial unknown temperature $T_1$ and time $t_0$, the readings on the thin and thick samples 32 and 32a are $d_1$ and $d_2$. It is assumed that in terms of actual thickness of the layer of metal removed during the test, both specimens 32 and 32a diminish equally. When $T_2$ is higher than $T_1$, then the values of $d_1$ and $d_2$ are lower than they would have been if the temperature had remained constant.

The readings corrected to the initial temperature become $d_1^0$ and $d_2^0$ and these corrected readings relate to the actual readings as:

$$d_1^0 \frac{1}{1+a(T_2-T_1)} = d_1$$

and $$d_2^0 \frac{1}{1+a(T_2-T_1)} = d_2$$

$$d_2^0 - d_1^0 = (d_2-d_1)[1+a(T_2-T_1)]$$

where $a$ is the thermal coefficient of the electrical resistivity of the metal sample.

Now, if both specimens corrode with the same rate, the distances $d_2^0 - d_1^0$ and $D_2 - D_1$ must be equal for any time, and $$\frac{D_2-D_1}{d_2-d_1} = 1+a(T_2-T_1)$$

from which it follows, that the corrected $d_1$ reading is $$d_1^0 = d_1 \frac{D_2-D_1}{d_2-d_1}$$

Another embodiment of the test plug is shown by Figure 8 wherein two electrodes 34 and 35 of relatively large diameter pass through the insulating plug 25. The electrical resistance of the rod-like electrodes 34 and 35 is negligible as compared with the strip-like specimen 36. Thus, to simplify the plug, the potential pick-up leads may be connected to the external ends of the electrodes 34 and 35 instead of making the contact directly to the specimen 36. A similar substitution can be made in Figure 5 by using only two rods to support the specimen 32. Likewise, the simplification can be applied to the arrangement of Figure 6, thereby cutting the number of electrodes to three.

In Figure 9 two rod-like electrodes 37 and 38 made of two thermocouple alloys or metals, e. g. one of Chromel and another of alumel, support the specimen 39. The connections to the external ends of the electrodes 37 and 38 are made by conventional type thermocouple extension wires down to a point of a reasonably constant temperature. On the direct corrosion recording unit, one reading is taken with the current in one direction and the other with a reversed current flow. This can be accomplished by modifying Figure 1 so as to include two synchronized reversing switches, one between the specimen 11 and resistances 12 and 13, and another between the specimen 11 and the potential controller-indicator 14. These switches are synchronized with the internal rotating selector switch in the multipoint recording potentiometer 18, so that the current through the specimen is reversed when the recording point in the potentiometer changes.

From the two readings and the difference between them, it is possible to calculate the temperature and the conductivity of the sample, inasmuch as the rod-like electrodes are of very high conductivity.

In making a test with the plug illustrated in Figure 9, two types of potential pick-up can be used between points $a$ and $b$ of Figure 2. One potential reading is taken without an applied current and serves as a measure of the temperature of the specimen 39. In the other reading, an A. C. current is sent through the specimen and after filtering the D. C. component of the potential between points 20 and 21, the A. C. potential component is rectified and fed into the potential sensing part 14 of the circuit. In this other reading, the potential drop along the resistance 12 is also rectified before it is fed into the potentiometer 13. In this case, a multiple point recording potentiometer is used, and the switching of the appropriate elements of the circuit to obtain both kinds of readings is done by an assembly of properly arranged switches acting synchronously with the rotating selector switch of the potentiometer 18.

From the above it will be apparent that I have attained the objects of my invention and provided a novel and useful system for corrosion testing in industrial systems. The invention has been described in terms of specific examples set forth in considerable detail. However, it should be understood that these are by way of illustration only and that the invention is not limited thereto. Alternative embodiments and operating techniques will become apparent to those skilled in the art in view of my disclosure and accordingly modifications of my invention are contemplated without departing from the spirit of the described invention or from the scope of the appended claims.

I claim:

1. A test sample assembly for a corrosion-testing apparatus comprising in combination a first corrosion-resistant electrically non-conducting plug member, thread means on said plug member adapted to engage a tapped bore in a corrodible wall member, electrically conducting support members extending through said first plug member, said electrically conducting members being corrosion-resistant, and an expendable electrically conducting test strip specimen fixed across the adjacent ends of said support members transverse to the axis of said plug whereby said specimen can be exposed to corrosive fluid confined by said wall member.

2. The test sample of claim 1 wherein a part of the test strip specimen is coated with a protective layer so that it does not corrode and wherein one of said electrically conducting support members contacts the test specimen intermediate the ends thereof.

3. In a corrosion testing assembly the combination comprising an externally threaded cylindrical plug, at least two supporting rods threaded within longitudinally extending bores through said plug, a test strip sample fixed across adjacent ends of said supporting rods transverse to the axis of said plug, and an electrical circuit means including said rods and sample, said electrical circuit means comprising a current source and a variable resistance in series with said sample, a potential-sensing means across said sample, a servomotor means responsive to said potential-sensing means for controlling said variable resistance so as to modify the current and maintain the potential across the sample constant as its cross-section decreases with time, and a recording potentiometer across a segment of said circuit responsive to the progressive changes in the current while maintaining the potential constant as an indication of the extent of corrosion of said sample.

4. An apparatus for use in corrosion testing comprising a test strip sample, a carrier for said test strip sample adapted to be introduced into a flowing stream of corrosive fluids, a current source applied across said sample, a variable resistance in series with said current source and said sample, a second resistor in series with said current source, said sample, and said variable resistance, a recording potentiometer across said second resistance, a potential-sensing means applied across said sample, a control means for adjusting said variable resistance whereby current passing through the sample is controlled, and a control means responsive to the potential-sensing means for automatically and simultaneously reducing the current flow through the sample so as to maintain a constant potential drop thereacross, said recording potentiometer measuring changes in the current flow through the circuit which indicate the extent of corrosion of the sample.

5. An apparatus for corrosion testing comprising an electrically non-conducting plug adapted to be fixed through a wall member, a first pair of electrodes extending longitudinally through said plug, a second pair of supporting electrodes extending longitudinally through said plug and aligned between said first pair of electrodes, a test strip specimen welded to the adjacent four ends of said electrodes, said test specimen being connected in a direct corrosion-testing circuit, said circuit comprising a current source, a variable resistance in series with said current source and said first pair of electrodes, a potential-current-sensing means connected across said second pair of electrodes, and motor means controlled by said potential-sensing means for varying said resistance whereby the current to said specimen is reduced automatically so as to maintain a constant potential across said second pair of electrodes.

6. An apparatus for corrosion-testing comprising in combination an electrically non-conducting plug adapted to be threaded through a wall of a vessel, a pair of supporting electrodes extending longitudinally through said plug in spaced relation to each other, an electrically conducting expendable test strip sample fixed across adjacent ends of said electrodes transverse to the axis of said plug, means for applying a controllable current to the opposite adjacent ends of said electrodes, means for sensing the potential drop across said strip sample, and means controlled by said potential drop-sensing means for decreasing the current applied to the said sample so as to maintain a constant potential drop across the strip sample.

7. The apparatus of claim 6 wherein a temperature-sensitive means is carried by said plug adjacent said sample.

8. A corrosion-testing element comprising in combination a carrier, a first pair of supporting rods extending through said carrier, a second pair of supporting rods extending through said carrier aligned between said first pair of rods, a third rod spaced intermediate said first and second pair of rods, and a metal test sample extending across said support rods, said sample being of abruptly varying thickness at the junction of said third rod with the sample, the thicker portion of said sample being two to five times the thickness of the thinner portion.

9. The apparatus of claim 8 wherein the thicker portion of the sample is coated with a protective layer so that it does not corrode.

10. The method for corrosion testing comprising the steps of exposing an expendable test sample within a corrosive fluid, applying an initial current to said sample, measuring the initial potential drop across said sample with the passage of said initial current, repeating the measurement of potential drop during the exposure of the sample to the corrosive fluid, adjusting the current through said sample automatically so as to maintain the initial potential drop across the sample, and measuring the adjustment in the current flow as an indication of the extent of corrosion during the exposure.

11. The method of corrosion testing of corrodible metal vessels which comprises the steps of exposing in a vessel an expendable corrosion test sample of the metal of the vessel, electrically insulating said sample from said vessel, passing a known electric current through said sample, measuring the potential drop across said sample, maintaining the potential drop constant by adjusting the current passed through said sample in response to variations in the measured potential drop, and measuring the change necessary to maintain said potential drop constant as an indication of the extent of corrosion of the test sample and of the vessel.

12. The method for corrosion testing comprising the steps of exposing an expendable electrically conducting test strip sample within a corrosive fluid, applying an initial current across said sample, measuring the initial potential drop across said sample during the passage of said initial current, continuously measuring the potential drop across the sample during the exposure thereof to the corrosive fluid, adjusting the current through said sample automatically so as to maintain the measured initial potential drop across the sample, and obtaining an indication of the change in current as a measure of the extent of corrosion during the exposure.

13. An apparatus for testing corrosion comprising in combination a means for exposing a test sample within a corrosive fluid, means for applying an initial current to said sample, means for measuring the initial potential drop across said sample with the passage of said initial current, means for the measurement of potential drop during the exposure of the sample to the corrosive fluid, means for varying the current through said sample automatically so as to maintain the initial potential drop across the sample, and means for measuring the variation in the current as an indication of the extent of corrosion during the exposure.

14. An apparatus for corrosion testing of corrodible metal vessels which comprises means for exposing in a vessel a corrosion test sample of the metal of the vessel, means for electrically insulating said sample from said vessel, means for passing an electric current through said sample, means for measuring the potential drop across said sample, means for maintaining the potential drop constant by varying the current passed through said sample in response to the variations in the measured potential drop, and means for measuring the change in current necessary to maintain said potential drop constant as an indication of the extent of corrosion of the test sample and of the vessel.

15. An apparatus for corrosion testing comprising means for exposing an electrically conducting test sample within a corrosive fluid, means for applying an initial current across said sample, means for measuring the initial potential drop across said sample during the passage of said initial current, means for continuously measuring the potential drop across the sample during the exposure thereof to the corrosive fluid, means for changing the current through said sample automatically so as to maintain the measured initial potential drop across the sample, and means for obtaining an indication of the change in current as a measure of the extent of corrosion during the exposure.

References Cited in the file of this patent

UNITED STATES PATENTS

| | | |
|---|---|---|
| 1,405,469 | Westcott | Feb. 7, 1922 |
| 1,811,765 | Snelling | June 23, 1931 |
| 2,512,857 | Gow | June 27, 1950 |

OTHER REFERENCES

"Quantitative Evaluation of Corrosive Conditions" by Bonwitt and Eisen; reprint from ASTM Bulletin No. 151, March 1948.

"Proceedings, Physical Society," J. C. Hudson, vol. 40, pages 107–129, 1927.